Feb. 19, 1963 R. W. KETCHLEDGE 3,078,447
COINCIDENT FLUX MEMORY DEVICE
Filed March 31, 1961 3 Sheets-Sheet 1
FIG. 1
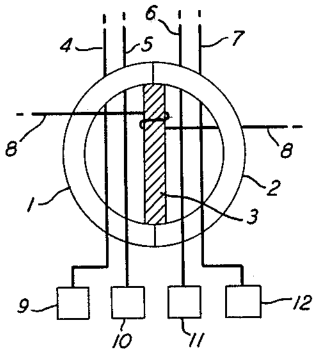
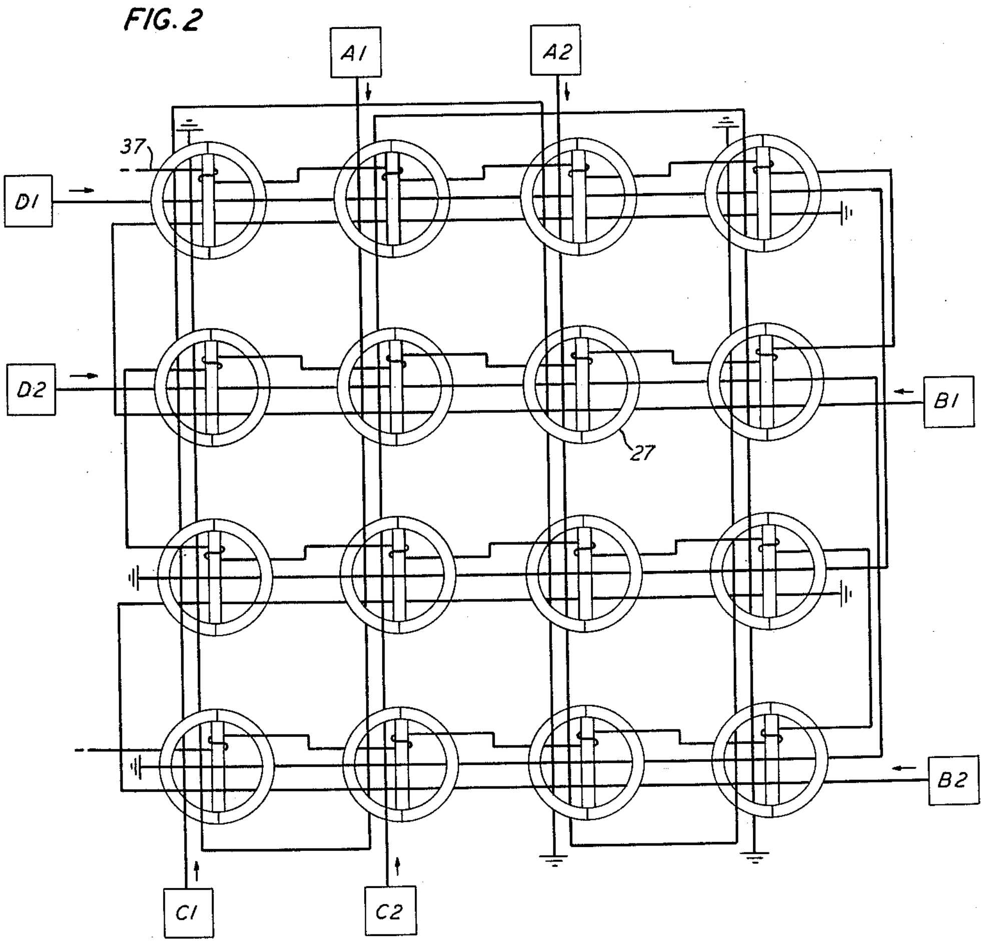
INVENTOR
R. W. KETCHLEDGE
BY SE Hollander
ATTORNEY INVENTOR
R. W. KETCHLEDGE
BY SE Hollander
ATTORNEY INVENTOR
R. W. KETCHLEDGE
BY S E Hollander
ATTORNEY United States Patent Office 3,078,447

Patented Feb. 19, 1963

3,078,447

COINCIDENT FLUX MEMORY DEVICE

Raymond W. Ketchledge, Whippany, N.J., assignor to Bell Telephone Laboratories, Incorporated, New York, N.Y., a corporation of New York Filed Mar. 31, 1961, Ser. No. 99,923
25 Claims. (Cl. 340—174)

This invention relates to magnetic cores and, more particularly, to a four-current coincident flux memory.

Single aperture magnetic cores having two stable remanent magnetization states have found widespread use as temporary memories or logic elements in recent years. Materials exhibiting magnetic remanence maintain a flux in either one direction or the other, the particular direction representing one bit of information.

The access problem is one to which much attention has been paid with the advent of large size memory arrays. A matrix array of magnetic cores containing, for example, 50,000 elements requires complex circuitry for choosing a particular core when it is desired to set or interrogate that core.

Access to these cores is most often achieved by coincident current techniques. Traditionally the cores are arranged in rows and columns of a matrix array. An individual conductor threads every core in each row. Another conductor threads every core in each column. Cores exhibiting magnetic remanence do not have their flux directions switched unless a minimum predetermined current is passed through the cores. In choosing a particular core in the array more than half of but less than this critical current is applied to a particular row and a particular column conductor. The only core to which a current greater than this minimum current is applied is that core through whose aperture both of the selected conductors pass. This core is, therefore, the only one in the array whose flux is switched.

If the array contains $n$ rows and $n$ columns, it is seen that there are $2n-2$ cores to which approximately half of the requisite switching current is applied. One core has more than the critical current passing through its aperture and the remaining cores of the array have no magnetomotive forces applied to them.

The applied currents must be maintained between upper and lower bounds. The upper bound must be maintained to insure that a single current will not switch a core. The lower bound is necessary to insure that the coincidence of two currents will switch the selected core. A 2:1 margin is obtained, that is, no more than approximately half of the requisite switching magnetomotive force is applied to any core other than the selected one.

An $n \times n$ matrix array utilizing this coincident current selection requires two groups of $n$ conductors each. To select a particular core access must be gained to one conductor in each group of $n$, or a total of two out of $2n$ conductors.

It is possible to reduce the number of conductors to which access must be gained. For example, were three conductors passed through each core and approximately one-third of the switching current applied to each of the three selected conductors, the total number of conductors required would be fewer. Consider a matrix array arranged in cubic form, each edge containing $n$ cores with a total of $n^3$ cores in the array. If there are $n$ conductors associated with each dimension of the array and each conductor is threaded through all cores in a plane of the array containing $n^2$ cores, the application of a current pulse to one conductor in each group results in the selection of only one core. The intersection of three planes is a single point, here being a unique core. Thus, in an array containing $n^3$ cores it is necessary to select three from a total of $3n$ conductors. In the planar array of $n^2$ cores it is necessary to select two of $2n$ conductors. In each case $$\frac{1}{n}$$

of the total number of conductors must be chosen to single out a unique core. However, the ratio of the number of cores in the array to the number of access conductors for the cubic and planar arrays are respectively $$\frac{n^2}{3} \text{ and } \frac{n}{2}$$

For large arrays it is apparent that a three-current coincident flux memory is highly desirable as the access circuitry can be greatly minimized. If a four-current coincident flux memory is used the advantages are even greater.

However, the limitations on the applied current magnitudes and the difficulty of obtaining uniform cores have heretofore generally militated against the use of coincident current techniques with more than two currents. In the cubic array, for example, it is seen that although only one core has three currents applied to it a great number have two currents. All cores situated on the lines at the intersections of any two planes of the three chosen are pulsed by two currents. Assuming that each current is approximately one-third of the requisite switching current, these cores have applied to them magnetomotive forces whose magnitudes are two-thirds of the switching magnetomotive force. The traditional and conservative 2:1 margin is no longer had and if the currents increase slightly or particular cores require slightly less applied magnetomotive force to switch, those cores at the intersection of only two planes switch as well as the single core residing in the three chosen planes. This problem is greatly magnified in the four coincident current memory as some nonselected cores have applied to them three-fourths of the switching magnetomotive force.

It is an object of this invention to provide an improved magnetic core matrix array.

It is another object of this invention to provide a four coincident current magnetic core matrix wherein a 2:1 margin is maintained.

It is another object of this invention to provide a magnetic core matrix array with reduced access circuitry.

It is still another object of this invention to provide an improved four-input AND gate.

It is a further object of this invention to extend the number of coincident inputs to numbers greater than four.

The magnetic core in an illustrative embodiment of this invention is comprised of three magnetic legs joined together at respective ends. The outside legs are magnetically soft, the inside leg being magnetically hard. Two separate conductors are threaded through each of the two apertures formed by the three legs. Only the simultaneous application of currents to all four of these conductors sets the magnetic flux in the central leg. Currents applied to less than all of the four conductors result in the application of a magnetomotive force to the central leg that is at most approximately one-half of the magnetomotive force applied when all four conductors are energized. Unequal magnetomotive forces applied around the two apertures result in flux being shunted away from the inside leg by the low reluctance outside paths. A 2:1 margin is maintained because even the energization of three of the four conductors results in no more than half of the switching magnetomotive force being applied to the central leg. A read-out loop is wound around the central leg and senses the switching of the remanent flux in that leg.

It is a feature of this invention that a 2-to-1 operating margin be maintained in a magnetic memory device with more than two access circuits by providing a remanent magnetic member shunted by at least two nonremanent magnetic paths, each of the nonremanent paths having at least two access circuits associated therewith.

More specifically, it is a feature of certain embodiments of this invention that the remanent magnetic member extend across the closed loop of a magnetic path composed of soft magnetic material, the loop being either the equivalent magnetic loop in the structure or actually provided by a closed ring of soft magnetic material.

It is another feature of this invention that the access circuits be arranged for coincident operation such that unless all access circuits of each nonremanent path shunting the remanent members are energized a low reluctance magnetic path around the closed loop is preferred with insufficient magnetic flux being driven through the remanent member across the loop to switch the remanent state thereof.

It is a further feature of my invention that such magnetic memory devices be arranged in a matrix array with the access circuits threading devices in a number of arrays whereby the number of access circuits is drastically reduced over having a single access circuit for each row and each column in the array, such reduction, however, occurring without any sacrifice of the optimum 2-to-1 operating margin for coincident operation of a magnetic memory array.

A complete understanding of this invention and the various features thereof may be gained from consideration of the following detailed description and the accompanying drawing, in which:

FIG. 1 depicts one illustrative embodiment of my invention;

FIG. 2 shows an array utilizing the magnetic core arrangement of FIG. 1;

Figure 3:
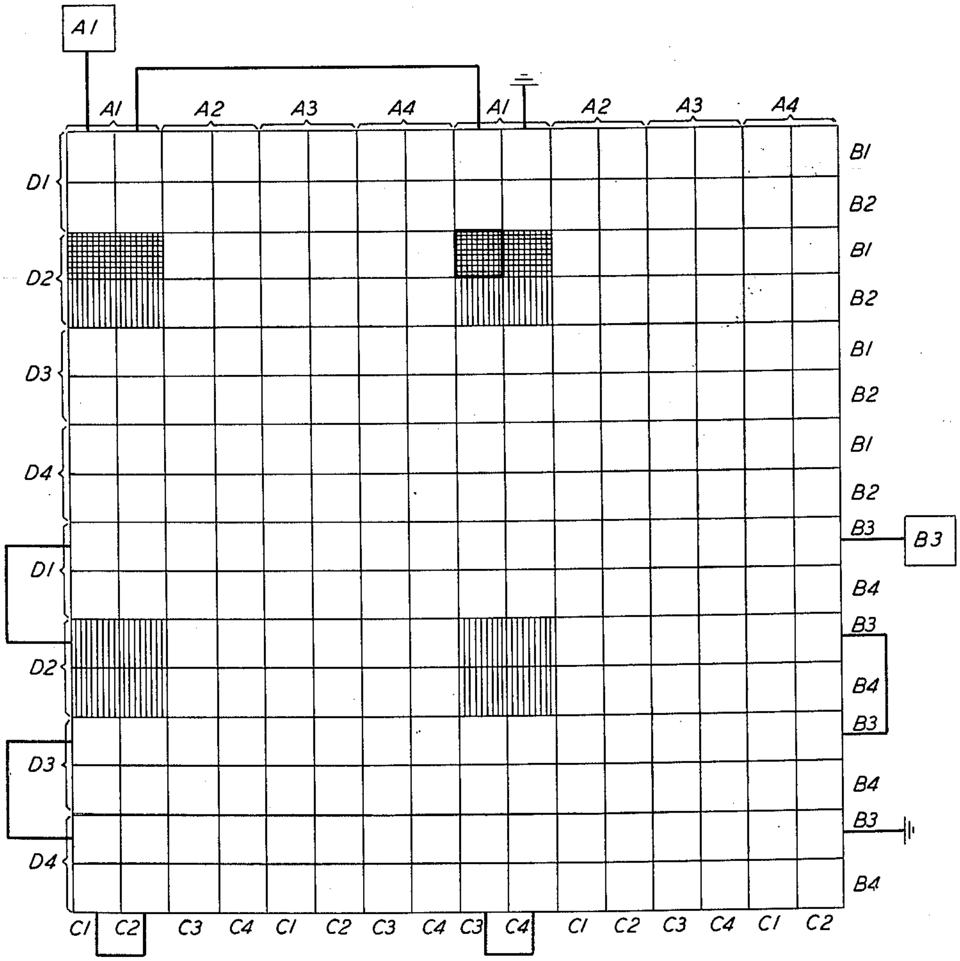
FIG. 3 represents the wiring pattern for a larger array than that of FIG. 2 and reveals how the access circuitry required for a matrix array of the cores of this invention is greatly simplified.

The core of FIG. 1 comprises two sections, 1 and 2, of nonretentive magnetic material. Member 3 along a diagonal of the core is a remanent magnetic material having two stable magnetization states. This retentive member is magnetically coupled to the two-branch nonremanent core. Conductors 4 and 5 and conductors 6 and 7 are threaded through the two respective left and right apertures of the core. Winding 8 on member 3 detects the reversal of flux in the central leg.

Sources 9, 10, 11, and 12 apply currents in either direction to respective conductors 4, 5, 6, and 7.

The setting of flux in the central leg is effected by causing the four currents to produce oppositely directed magnetomotive forces in branches 1 and 2. Assume, for example, that sources 11 and 12 are negative in polarity. The currents flowing in conductors 6 and 7 apply a counterclockwise magnetomotive force around the right-hand aperture. Sources 9 and 10 of positive polarity cause a clockwise magnetomotive force around the left-hand aperture to be applied. Flux is in an upward direction in both branches 1 and 2, the return path necessarily being down through member 3. The currents are of sufficient magnitude so that when all four conductors are energized, the magnetomotive force applied to the central leg is sufficient to switch its magnetization state. After being set the flux is maintained in the device due to the remanent character of leg 3. If the directions of current in the two sets of conductors are reversed, the directions of flux set up are correspondingly opposite to those previously stored in the device. When the flux in member 3 reverses a voltage is induced in sense winding 8.

In an array comprising a plurality of these devices the flux in member 3 when in the downward direction might indicate that information has been written into the core. Interrogation of the core would consist of the switching of flux in member 3 to the upward direction. An induced voltage on sense winding 8 is indicative that the core was previously written into.

The energization of three or fewer of conductors 4, 5, 6, and 7 results in no more than approximately half of the requisite switching magnetomotive force being applied to member 3. If current flows in a single conductor, for example conductor 7, flux is set in branch 2. This flux, however, does not enter member 3 as branch 1 is in shunt with it and presents a low reluctance path. Substantially all of the flux in branch 2 enters branch 1, the only flux in the device thus being along the circumference of the core. There is no substantial magnetomotive force applied across member 3. When the current pulse in conductor 7 is terminated, the flux in the magnetically soft perimeter disappears. Similar remarks apply to the application of a current pulse to any one of the other three conductors.

Currents applied only to conductors 4 and 5 or only to conductors 6 and 7 merely result in twice the flux around the outer perimeter. Again there is no magnetomotive force across member 3 and its magnetization state is unaffected.

Currents applied to one of conductors 4 and 5 and to one of conductors 6 and 7 in such directions as to produce aiding fluxes in member 3 do not affect the magnetization state of this leg. The current magnitudes are adjusted so that if only one conductor in each set is energized only approximately half of the switching magnetomotive force is applied to leg 3. It is only when all four conductors are energized with twice this magnetomotive force being applied to leg 3 that it switches magnetization state.

If any three conductors are energized, again only half the switching magnetomotive force is applied to the central leg. The additional current through one of the apertures merely forces flux around the outer perimeter as there is no fourth current through the other aperture setting up an oppositely directed flux.

Thus, it is seen that it requires the application of currents of spacified magnitudes to all four of conductors 4–7 to set member 3. Energization of any number less than the total number of conductors results in the application of at most approximately one-half of the switching magnetomotive force to the magnetically hard central leg. A 2:1 margin is maintained although effectively a four-input AND gate is achieved.

FIG. 2 shows a 4 x 4 matrix array utilizing the cores of FIG. 1. There are eight access conductors for this array which is the same number required were the two coincident current technique used. FIG. 2 illustrates the technique for utilizing the cores of this invention in a matrix array and facilitates an understanding of FIG. 3 where it is shown that in a 16 x 16 matrix array only 16 conductors are required rather than 32 where two coincident current techniques are utilized. The full advantages of the instant invention wil become apparent upon consideration first of FIG. 2 and then of FIG. 3.

An $n \times n$ planar array of conventional magnetic cores requires two groups of $n$ conductors each for access purposes. An $n \times n \times n$ cubic array requires three groups of $n$ conductors each. With $n^4$ cores and four groups of $n$ conductors each, as with the planar and cubic arrays, each conductor is connected to $$\frac{1}{n}$$

of the cores of the array. Thus with $n^2$ of the cores of this invention and four groups of conductors, each conductor must be coupled to $$\frac{1}{\sqrt{n}}$$

of the cores in the array. In the illustrative embodiments two dimensional arrays are shown. The array consists of $n^2$ cores with each conductor in each of the four groups coupled to $$\frac{1}{\sqrt{n}}$$

of the cores in the array.

While this formula determines the number of cores to which each conductor is coupled, it does not determine the total number of conductors in each group. Assuming that there are $x$ conductors in each group, the maximum number of combinations of four with these conductors is $x^4$. As each intersection of four conductors selects one core, with an $n$ x $n$ matrix, $x^4$ must be at least as great as $n^2$. The number of conductors, $x$, in each of the four groups must, therefore, be at least equal to $\sqrt{n}$.

FIG. 2 shows a 4 x 4 matrix. Thus, each of the four groups contains $\sqrt{4}$ or two conductors. Each conductor is coupled to $$\frac{1}{\sqrt{4}} \text{ or } \frac{1}{2}$$

of all cores in the array. The application of currents to one conductor in each group of two sets a unique core. Only that unique core is set as the remaining 15 cores have at most one-half of the switching magnetomotive force applied to their central legs.

The four groups of conductors are symbolized by the letters A, B, C, and D. Either source A1 or A2 energizes a respective one of the two conductors in group A. Similar remarks apply to groups B–D.

The A and C conductors pass through the left-hand aperture of the cores while the B and D conductors pass through the right-hand apertures. Thus, the A and C conductors correspond to conductors 4 and 5 of FIG. 1 with similar remarks applying to groups B and D and conductors 6 and 7.

Currents are shown flowing out of the eight current sources. The cores have been threaded so that these currents set a flux in the downward direction in the central leg of that core which lies at the intersection of the four conductors selected. When the reverse polarity currents are applied by the sources the flux is set in the upward direction in the selected core. A flux reversal in the central leg of this core induces a voltage in the common read-out winding 37, this voltage indicating a change of state.

As a particular example, suppose it is desired to set the flux in the central leg of core 27 in the downward direction. The four conductors coupled to this core are connected to sources A2, B1, C1, and D2, the currents applied to these four conductors being in the directions shown. Each current applies a magnetomotive force to the central leg of all cores through which it passes in the downward direction. However, only core 27 has all four of its conductors energized and it is the only core that will be set with the desired polarization. All other cores have applied to them magnetomotive forces that are at most equal to approximately one-half the magnetomotive force required for setting the magnetizations of the central legs.

There are in this array eight conductors from which it is necessary to choose four to select a unique core. With two coincident current techniques, it would be necessary to choose two conductors from a total of eight. The full advantages of the cores of this invention become apparent upon consideration of more widely used larger arrays.

FIG. 3 is symbolic of a 16 x 16 matrix array where each box represents one core. Each conductor is coupled to $$\frac{1}{\sqrt{16}}$$

or one-fourth of all cores in the array. Each group contains $\sqrt{16}$ of four conductors. Thus, there is a total of 16 conductors. This is one-half the number required were two current coincident techniques used. Yet, a 2:1 margin is maintained.

The four groups are again designated by the letters A–D. The numbers 1–4 specify a particular conductor in each group. The wiring pattern of conductors A1 and B3 is symbolically represented. Each core resides in a row to which a unique B and a unique D conductor is coupled. The same core also resides in a column to which a unique A and a unique C conductor is coupled. A careful consideration of this diagram shows that any combination of one conductor from each group selects only one core, all other cores having not all of these four conductors coupled to them.

For example, if conductors A1 and D2 are energized each core in the four sections on the chart with vertical shading have two currents applied to them. If conductor 1 in group B is selected only those cores represented by the four boxes with horizontal shading have three currents applied to them. Finally, the conductor chosen from group C determines which particular one of these four is switched. In the diagram C3 was selected and the core symbolized by the box outlined is set.

Similar schemes can be applied to much larger arrays. For example, a 256 x 256 matrix array requires four groups with $\sqrt{256}$ or 16 conductors in each. The total number of conductors is thus $4 \times 16$ or 64. Were two coincident current techniques utilized the number of access paths would be $2 \times 256$ or 512. Thus while 4 conductors must be energized instead of 2, the number of access conductors is reduced by a factor of 8.

Each group must necessarily contain an integral number of conductors. If $\sqrt{n}$ is not an integer, the theoretical minimum number of access paths may not be achieved. However, the resulting array still affords a substantial improvement in the ratio of the number of cores to the number of access conductors.

Figure 4:
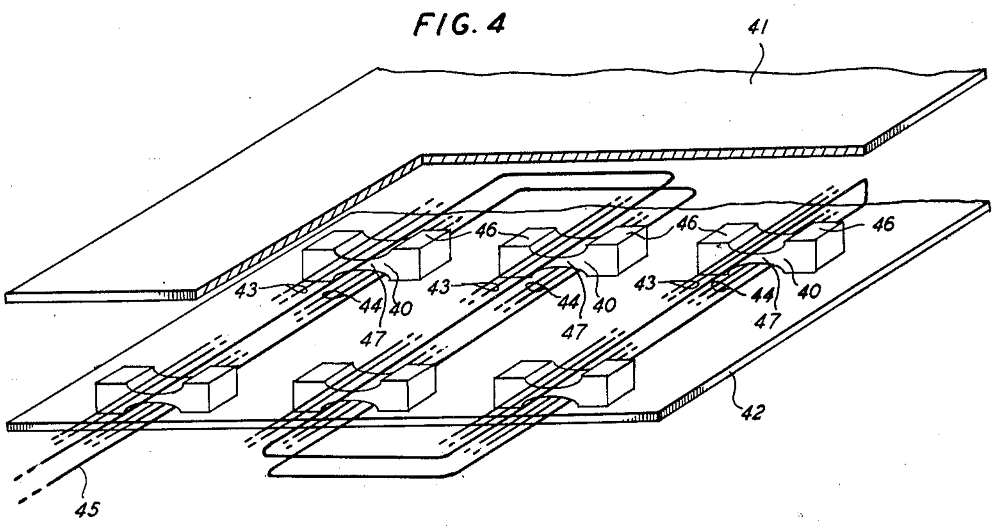
FIGS. 4 and 5 disclose two fabricating techniques for forming matrix arrays utilizing the cores of this invention at considerably reduced cost.

FIG. 4 shows one embodiment of a physical construction of an array of the memory cores of this invention. With conventional single or multi-aperture cores it is necessary to thread the conductors through the various cores. This process can be time-consuming and costly. It is completely avoided with the fabrication technique of FIG. 4.

In FIG. 4 dumbbell-shaped ferrite parts 40 are sandwiched between magnetically soft sheets 41 and 42. Bar 47 is equivalent to member 3 in FIG. 1. Each branch equivalent to branches 2 or 3 in FIG. 1 comprises a portion of the sheets 41 or 42 and the end sections 46 of the individual members 40. Although the ends 46 are of magnetically hard material, due to the fact that the area of each member 40 connected to the soft sheet is so large, its reluctance is quite low. Thus, effectively there is a closed path of soft material comprising a portion of sheets 41 and 42 and the two ends 46 around each magnetically hard bar 47.

The array may be fabricated without the necessity of threading conductors through individual elements. The two conductors 44 associated with each element corresponding to conductors 4 and 5 of FIG. 1 may be laid on sheet 42. In a similar manner conductor 45, the sense lead, may be placed on sheet 42 as shown. Members 40 are then put in place. Conductors 43 associated with each element corresponding to conductors 6 and 7 of FIG. 1 may then be laid on top of members 40. Sense conductor 45 is similarly laid down on top of members 40 as shown. Finally, sheet 41 is attached to top faces of each element. In this manner an array of the devices may be fabricated without threading conductors through the individual elements. The holes are actually "manufactured" after the wires are in place.

Figure 5:
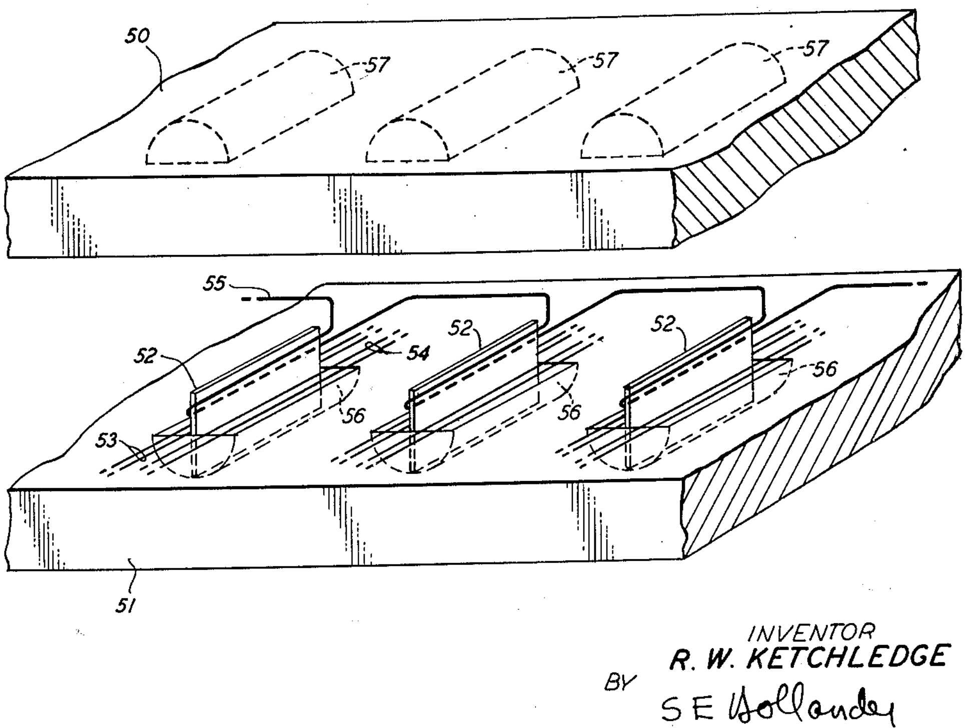

FIG. 5 shows another method of fabricating an array of the devices. The two sheets 50 and 51 are again of soft magnetic material. The rectangular-shaped elements 52 are magnetically hard. In sheet 51 semicylindrical indentations 56 are made with corresponding indentations 57 in sheet 50. When the two sheets are fitted together these indentations lie opposite each other. The members 52 are inserted in indentations 56 before the two sheets are joined. Conductors 53 and 54 and sense winding 55 may then be placed proximate to the appropriate members 52. When sheet 50 is placed on top of sheet 51 it is seen that there is a closed path of soft material around each hard member 52 with the member along a diagonal of the cross section of the hollowed out cylindrical volume. Again, it is not necessary to thread each element. The wiring grid is created first, the magnetic loops second.

Instead of providing four conductors through each core through which currents can flow in either direction, it is possible to provide two sets of four conductors each in any of the embodiments of the invention. Currents would be applied to corresponding conductors in each group in only one and in opposite directions. Reading and writing into the core elements are achieved by pulsing the two different sets of conductors.

What has been described so far are structures having one magnetically hard leg in parallel with two magnetically soft legs. This is a highly useful form of the invention. However, in some applications it may be desirable to increase the number of coincident inputs still further. This can be done by increasing the number of parallel soft legs to more than two. Such a structure would consist of M legs of magnetically soft material in parallel with one magnetically hard leg. Each magnetically soft leg would be excited by at least one conductor. Just as in the two soft leg case, all M legs must be driven to produce drive across the hard leg. If only M−1 soft legs are driven, the flux will return through the soft leg that is not driven in preference to flowing through the magnetically hard leg. As M is made larger, the reluctance of each soft leg must be kept low enough to effectively shunt the flux produced by the driven legs thereby preventing sufficient magnetomotive force from appearing across the hard leg to switch it.

Although the invention has been described with reference to certain specific embodiments, it is to be understood that these embodiments are only illustrative of the application of the principles of the invention and that various modifications may be made therein without departing from the spirit and scope of the invention.

What is claimed is:

1. A magnetic core memory device comprising at least two closed paths of magnetic material, a magnetic member having two stable magnetization states, each of said paths including said member therein, the remainder of said paths being of magnetically soft material and comprising no other mutual parts, and a plurality of means for applying magnetomotive forces in opposite directions around each of said paths, said member having a reluctance great enough to prevent a change in its magnetization state in the absence of the simultaneous operation of said plurality of magnetomotive force application means.

2. A magnetic core memory device comprising at least two closed paths of magnetic material, a magnetic member having two stable magnetization states, each of said paths including said member therein, the remainder of said paths being of magnetically soft material and comprising no other mutual parts, and means for applying magnetomotive forces of predetermined values around each of said paths for switching the remanent magnetization of said member only when said magnetomotive forces are applied simultaneously to said paths.

3. A magnetic core memory device comprising at least two closed paths of magnetic material, a magnetic member having two stable magnetization states, each of said paths including said member therein, the remainder of said paths being of magnetically soft material and comprising no other mutual parts, and a plurality of means for applying magnetomotive forces around said paths, all of the magnetomotive forces in said member being in the same direction and said magnetically soft material having reluctance small enough to shunt sufficient flux from said member if any one of said magnetomotive forces is not greater than a predetermined value to prevent said member from switching magnetization state.

4. A bistable device comprising a magnetic member having two stable magnetization states, a plurality of separate and distinct sections of soft magnetic material each connected across said member and forming therewith a plurality of apertures, and a plurality of means for simultaneously applying magnetomotive forces around all of said apertures for controlling oppositely directed fluxes around said apertures to switch the magnetization of said member.

5. A bistable device comprising a magnetic member having two stable magnetization states, a plurality of separate and distinct sections of soft magnetic material each connected across said member and forming therewith a plurality of apertures, and first and second means associated with each of said apertures for applying first and second magnetomotive forces around each of said apertures, said sections having reluctance small enough to prevent a magnetomotive force sufficient to switch the magnetization of said member from being applied to said member unless said second magnetomotive forces are applied around all of said apertures.

6. A magnetic core memory device comprising a plurality of closed magnetic material loops, a section of magnetic material having two stable remanent magnetization states, said section being included in each of said loops, the remaining portion of each of said loops comprising a soft magnetic material, and means for applying two or more discrete values of magnetomotive force around each of said loops, said soft magnetic material having a reluctance small enough relative to said section for preventing the switching of the magnetization of said seciton from occurring unless predetermined combinations of said discrete magnetomotive forces are applied to said device.

7. A magnetic core memory device comprising a bar of magnetic material, a number of sections of magnetic material connected across said bar and forming therewith a plurality of apertures, and means for applying at least two values of magnetomotive force around each of said apertures, said bar having a reluctance much greater than the reluctance of said sections for controlling a flux through said bar that is substantially no greater than the product of said number and the smallest flux through said sections.

8. A magnetic core memory device comprising first, second, and third branches joined together at respective ends, said first and third branches being of magnetically soft material, said second branch being of material having bistable-state magnetic remanence, first and second conductors passing between said first and second branches, third and fourth conductors passing between said second and third branches, and means for applying currents of one polarity to said first and second conductors and of a second polarity to said third and fourth conductors for switching the remanent magnetization of said second branch only when said currents are applied simultaneously to all four of said conductors.

9. A magnetic core memory device comprising first, second, and third branches joined together at respective ends, said first and third branches being of magnetically soft material, said second branch being of material having bistable-state magnetic remanence, first and second conductors passing between said first and second branches, third and fourth conductors passing between said second and third branches, and means for applying currents to said conductors for switching the remanent magnetization of said second branch.

10. A magnetic device comprising a magnetic member, first and second sections of magnetic material connected across said member, first and second means for applying magnetomotive forces to said first section to establish a first flux, and third and fourth means for applying magnetomotive forces to said second section to establish a second flux, said first and second sections having reluctance small enough to shunt a flux equal to the difference in magnitudes between said first and second fluxes from said member when said first and second magnetomotive forces are unequal in magnitude and in opposite directions.

11. A two-aperture magnetic core comprising a soft magnetic ring, means for coupling a bar of material having bistable-state magnetic remanence to two points on said ring, and first and second means for applying magnetomotive forces in opposite directions around said two apertures, said bar having a reluctance great enough to permit a change in the direction of remanent flux throughout said core only upon the simultaneous operation of said first and second magnetomotive force application means.

12. A bistable device comprising a magnetic member having two stable remanent magnetization states, first and second sections of magnetic material connected across said member, first and second means for applying magnetomotive forces to said first section, and third and fourth means for applying magnetomotive forces to said second section, said first and second sections having reluctance small enough to shunt sufficient flux from said member upon the operation of an odd number of said four means or upon the operation of either said first and second or said third and fourth means alone to prevent said member from switching magnetization states.

13. A combination in accordance with claim 12 wherein the reluctance of said member is sufficient to prevent the switching of flux therein in the absence of the simultaneous operation of said four means.

14. A magnetic device comprising a magnetic member, a plurality of sections of magnetic material connected across said member, and a plurality, greater than two, of means for applying magnetomotive forces to said sections, said sections having a reluctance small enough to shunt sufficient flux from said member to prevent said member from switching magnetization states if any one of said magnetomotive forces is not greater than a predetermined value and unless all of said magnetomotive forces oppose each other.

15. A magnetic memory device comprising a rod of magnetically remanent material and means for coincidentally applying a plurality, greater than two, of pulses for switching the remanent state of said rod while maintaining a two-to-one coincident operating margin, said means comprising a plurality of remanently soft magnetic members shunting said rod and winding means encompassing individual ones of said members.

16. A magnetic core memory device comprising a rod member of magnetically remanent material, means providing a closed magnetic loop of magnetically soft material, said rod being magnetically across said loop and coupled thereto at two points thereof to divide said loop into two sections, means providing multiple access circuits for each of said sections whereby magnetic flux circulates in said loop in shunt of said rod unless all of said access circuits are energized to provide minimum and opposite magnetic fluxes in said sections, and read-out means coupled to said rod and responsive to the switching of the magnetic state thereof.

17. A magnetic core memory array comprising a plurality of magnetic core memory devices each comprising a rod of magnetically remanent material, means providing a closed magnetic loop of magnetically soft material, said rod being magnetically across said loop and coupled thereto at two points thereof to divide said loop into two sections; said magnetic core memory devices being arranged in rows and columns; a plurality of access circuits less in number than the number of said rows and said columns, said access circuits including a plurality of conductors selectively coupled to each of said sections of each of said memory devices; and read-out means coupled to said rods and responsive to the switching of the magnetic states thereof.

18. A memory array comprising a plurality of magnetic two-state devices, said devices having a perimeter of magnetically soft material and a magnetically hard member magnetically coupled to points on said perimeter and forming therewith two apertures, a plurality of conductors with two of said conductors passing through each of said apertures and a different combination of four conductors passing through each of said devices, and means for applying currents to the four conductors passing through a particular device for switching the remanent flux in said particular device, said current applying means limiting the magnitude of said currents to apply at most substantially half of the magnetomotive force necessary for switching the remanent flux in said devices to all others of said devices.

19. A memory array comprising a plurality of two-state magnetic cores, said cores having a perimeter of soft magnetic material and a hard magnetic member magnetically coupled to points on said perimeter, a plurality of conductors threading said cores, means for applying currents to said conductors for completely switching the remanent fluxes in said cores, and means for limiting the magnitude of said currents to apply at most substantially half of the magnetomotive force necessary for switching the remanent flux in said cores to all of said cores whose fluxes are not switched by said currents.

20. A matrix array comprising a plurality of magnetic cores, each of said cores having a two-ended magnetic member with two stable remanent magnetization states and two sections of soft magnetic material each connecting the two ends of said member to form therewith two apertures, first, second, third, and fourth groups of conductors, each of said conductors in each of said groups passing through at most one of said apertures in at least one of said cores, means for selecting an individual one of said conductors in each of said groups of conductors, and means for applying currents to said selected conductors to produce a magnetomotive force in that core through whose apertures all four of said selected conductors are passed that is both sufficient to switch said member of said core and is at least twice as great as the magnetomotive forces applied to the magnetic members in all of the remaining cores in said array.

21. A matrix array comprising a plurality of magnetic cores, each of said cores having a two-ended magnetic member with two stable remanent magnetization states and a plurality of sections of soft magnetic material each connecting the two ends of said member to form therewith a plurality of apertures, a plurality of groups of conductors, each of said conductors in each of said groups passing through at least one of said cores, means for selecting an individual one of said conductors in each of said groups of conductors, and means for applying currents to said selected conductors to produce magnetomotive forces in any core through whose apertures all of said selected conductors are passed that are sufficient to completely switch the magnetization of said members.

22. A memory array comprising first and second sheets of magnetically soft material, a plurality of dumbbell-shaped elements of magnetically remanent material separating said sheets and forming apertures with each of said sheets, a plurality of conductors, two of said conductors passing through each of said apertures, and means for selectively energizing four of said conductors for switching the flux in any of said elements to which said four conductors are coupled.

23. A memory array comprising first and second sheets of magnetically soft material, a plurality of H-shaped elements of magnetically remanent material separating said sheets, each of said elements forming an aperture with each of said sheets, a plurality of conductors passing through each of said apertures, and means for energizing selected ones of said conductors for switching the flux in that element to which all of said selected conductors are coupled.

24. A memory array comprising two magnetically soft sheets of metal, said sheets having a plurality of indentations, a plurality of two-faced ferrite rods placed in said indentations and connecting said two sheets, a plurality of conductors threaded between said sheets along said rods with two of said conductors proximate to each face of said rods, and means for applying currents to four of said conductors to switch the magnetization of only the rod along which said four conductors are threaded.

25. A memory array comprising two magnetically soft sheets of metal, said sheets having a plurality of indentations, a plurality of ferrite rods placed in said indentations and connecting said two sheets, a plurality of conductors threaded between said sheets along said rods, and means for applying currents to selected ones of said conductors to switch the magnetizations of the rods along which all of said selected conductors are threaded.

No references cited.